Figure 1:
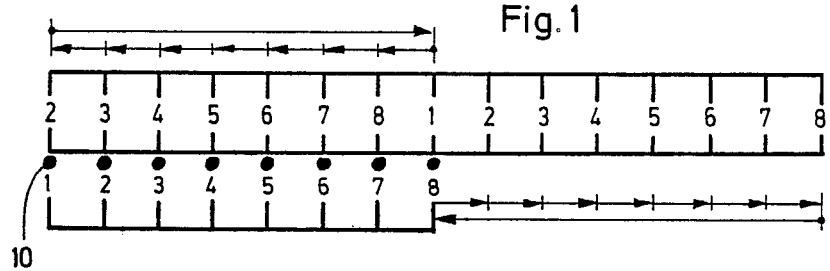

United States Patent [19]

Nagel et al.

[11] Patent Number: 4,982,634

[45] Date of Patent: Jan. 8, 1991

[54] MULTIPLE-SPINDLE AUTOMATIC LATHE

[76] Inventors: Peter Nagel, Schulstrasse 14, D-5780 Bestwig-Ramsbeck; Franz Schmid, Erlenweg 27, D-7411 St. Johann, both of Fed. Rep. of Germany

[21] Appl. No.: 261,544

[22] Filed: Oct. 24, 1988

[30] Foreign Application Priority Data

Oct. 23, 1987 [DE] Fed. Rep. of Germany ....... 3735926
Oct. 10, 1988 [DE] Fed. Rep. of Germany ....... 3834382

[51] Int. Cl.$^5$ .............................................. B23B 3/34
[52] U.S. Cl. ...................................... 82/129; 82/1.11; 29/36; 29/51; 29/33 P; 29/563
[58] Field of Search ................ 82/129, 118, 120, 1.11, 82/138, 124; 29/36, 51, 52, 53, 54, 33 P, 33 J, 27 R, 27 C, 563, 564

[56] References Cited

U.S. PATENT DOCUMENTS 1,527,791 2/1925 Flanders .
1,790,943 2/1931 Mullin .................................. 82/129

FOREIGN PATENT DOCUMENTS 1156292 10/1963 Fed. Rep. of Germany .
3428861 2/1985 Fed. Rep. of Germany .

Primary Examiner—Frederick R. Schmidt
Assistant Examiner—Lawrence Cruz
Attorney, Agent, or Firm—Young & Thompson

[57] ABSTRACT

The conventional multiple-spindle automatic lathes are expensive on account of their complicated construction, and the production output and production possibilities are limited on account of the restricted number of work spindles utilized. The novel automatic lathe is to offer higher production outputs and more universal manufacturing possibilities with a simpler construction.

The basic structure of an automatic lathe with eight tool spindles (10) for the manufacture of workpieces in eight successive machining stations resides in that, additionally to the number of basic tool stations (1 through 8), each basic tool station, except for the first, is once more included as an additional tool station (2 through 8) arranged in the same sequence of machining upstream of the basic tool stations (1 through 8) so that the total number of machining stations amounts to $N=2n-1$, a loading and unloading station being provided at the tool station (1). Machining of the workpieces takes place so that each workpiece, after each machining in a tool station, is shifted cyclically in a linear fashion relatively to the subsequent station, and, after seven conveying steps and a subsequent return stroke, or a return stroke between two conveying steps, enters into its initial machining station.

The multiple-spindle automatic lathe is usable for mass production of workpieces of a great variety of types.

3 Claims, 3 Drawing Sheets

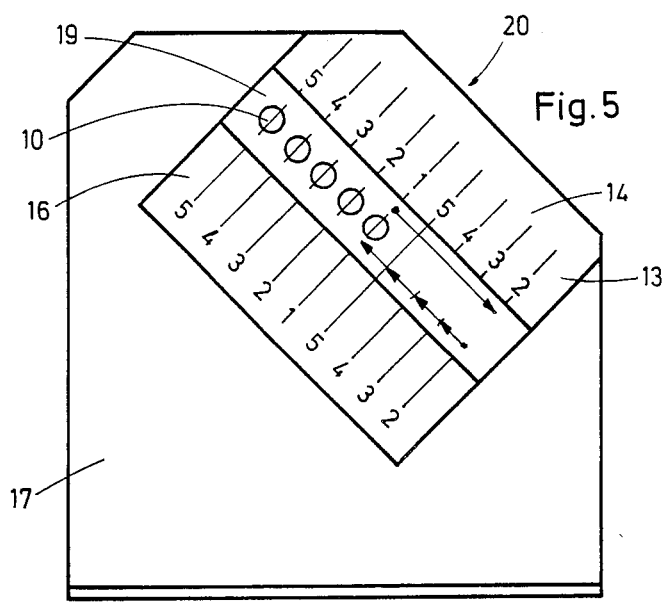
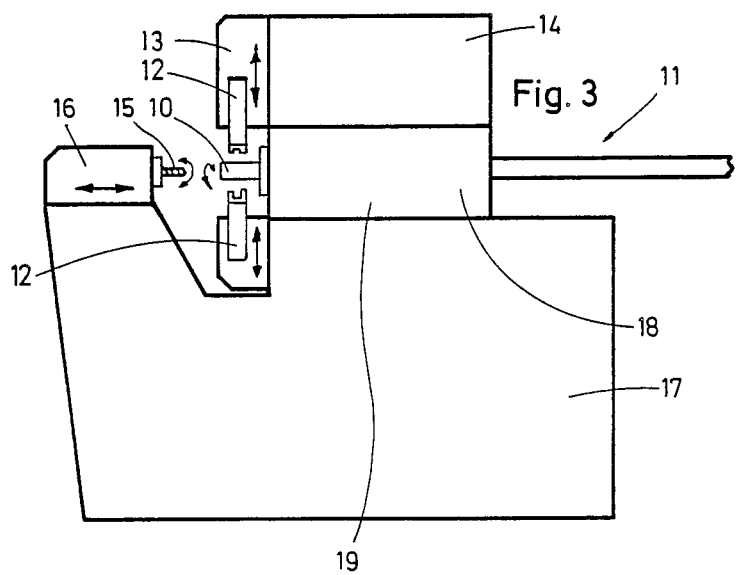

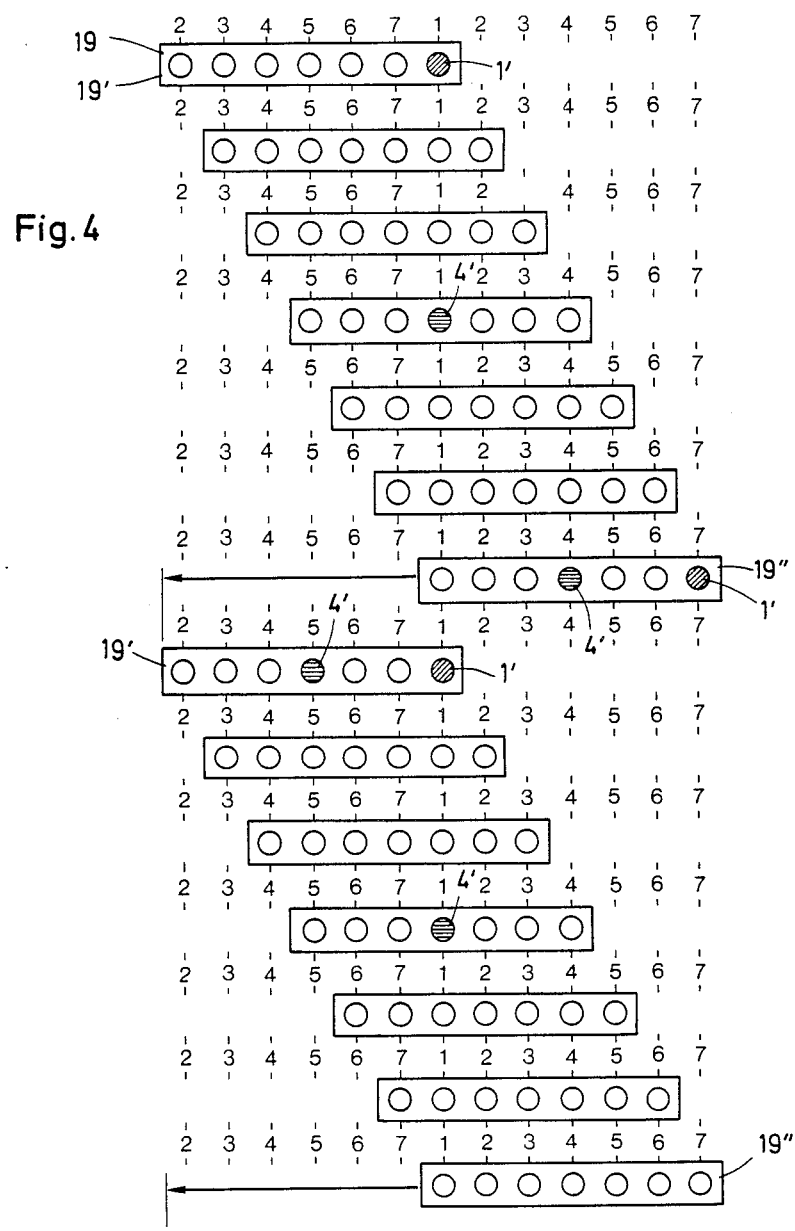

MULTIPLE-SPINDLE AUTOMATIC LATHE

The invention relates to multiple-spindle automatic lathes for the manufacture of workpieces in successive machining stations with work spindles and tool stations.

U.S. Pat. No. 1,527,791 discloses a two-spindle chuck-type automatic lathe with a support movable forwards and backwards in the direction of the spindle axes by means of a pneumatic or electric drive mechanism, and with a tool slide arranged on this support and capable of reciprocating transversely to the spindle axes by means of a pneumatic drive mechanism, this slide carrying respectively two toolholders with various tools, associated with a spindle, for machining the workpieces; these tools are continuously placed onto the holding mandrels, clamped into the chucks of the two spindles, and driven in a rotating fashion by the spindles. After the first machining step on the two workpieces seated on the holding mandrels of the spindles has been performed by the tools of the first toolholders, the tools of the second toolholders are brought into association, by means of a transverse feed of the tool slide, with the two workpieces to be machined simultaneously. After termination of the second working step, the support with the tool slide is removed from the spindles in the direction of the spindle axes; the finished workpieces are removed from the two machining stations, and two new workpieces are supplied, the drive mechanism of the tool slide is reversed by the return travel of the support, and the tool slide is moved back into its starting position. Thereafter, the tools of the two first toolholders of the tool slide are again placed into the operating position by advancement of the support, and a new operating cycle commences.

The construction of a two-spindle automat as described in DAS No. 1,156,292 is based on the principle of tools cyclically movable in the direction of the spindle axes and of spindles cyclically movable transversely to their axes, for driving the workpieces. In this two-spindle automatic lathe for the bilateral edge rounding of antifriction bearing rings, the spindle headstock with the two work spindles can be reciprocated by the spindle spacing transversely to the spindle axes. In the outer working positions, respectively one of the spindles is located in opposition to the joint toolholder with the machining tools, fixed in the transverse direction, and the other spindle lies in opposition to one of two fixedly arranged loading devices connected by a transfer chute with turning mechanism.

The two conventional automatic lathes with a complicated structure exhibit merely two work spindles so that their output is low and their manufacturing possibilities are very limited. In this connection, the production efficiency of the automatic machine according to DAS No. 1,156,292 with production of one workpiece per oeprating step is even below the efficacy of the automatic machine according to U.S. Pat. No. 1,527,791 with simultaneous manufacture of two workpieces per operating step.

Finally, DOS No. 3,428,861 shows a multiple-spindle automatic lathe operating according to the rotary cycle principle with a spindle drum to accommodate the work spindles, this drum being rotatably supported in a fixed machine frame and being advanceable to a number of switching positions corresponding to the number of work spindles. The work spindles rotatably arranged in the spindle drum are driven individually by separate electric motors with speed control.

The essential drawbacks of this conventional automatic lathe are to be seen in that the spindle drive mechanisms and the drive means for the spindle drum, as well as the rotary support of the drum, are very complicated. Furthermore, limits are imposed on the automatic lathe operating according to the rotary cycle principle with respect to the number of work spindles since, with an increasing number of spindles arranged in a drum, the drum diameter must be correspondingly enlarged and, with increasing drum diameter, the machining accuracy of the automatic lathe is impaired. Finally, the production output and the production possibilities of the automatic lathe are limited inasmuch as the tools can be brought into contact with the workpieces only radially from the outside, these workpieces being driven by means of the work spindles located at the end face of the drum, and the service life of the tools is relatively brief since the tools are in operation without interruption and are subject to great wear and tear due to extensive heating up.

The invention is based on the object of developing a multiple-spindle automatic lathe distinguished over the conventional automatic lathes by higher production outputs and more universal manufacturing possibilities, by increasing the number of work spindles and machining stations, and by a simpler construction.

In addition to the advantages that can be derived from the objects to be attained, the automatic lathe of this invention is distinguished over the conventional automatic machines by the following advantages:

The construction of the automatic lathe operating according to the linear cycle principle is less complicated, on account of accommodation of the work spindles in a joint headstock, than that of the conventional automatic machines with a rotary cycle principle, so that several machines can be designed more sensibly and better. The automatic lathe is extremely user-friendly. In the novel automatic machines, the infinitely variable and switched drive operation, for example CNC-controlled drive operation, can be realized so that, for example, the work spindles can be arrested independently of one another and can again be allowed to revolve independently of one another. The automatic lathe has a higher rigidity and improved storage facilities for headstock carriers and toolholders. Finally, unimpeded chip discharge is ensured in the automatic lathe.

Figure 2:
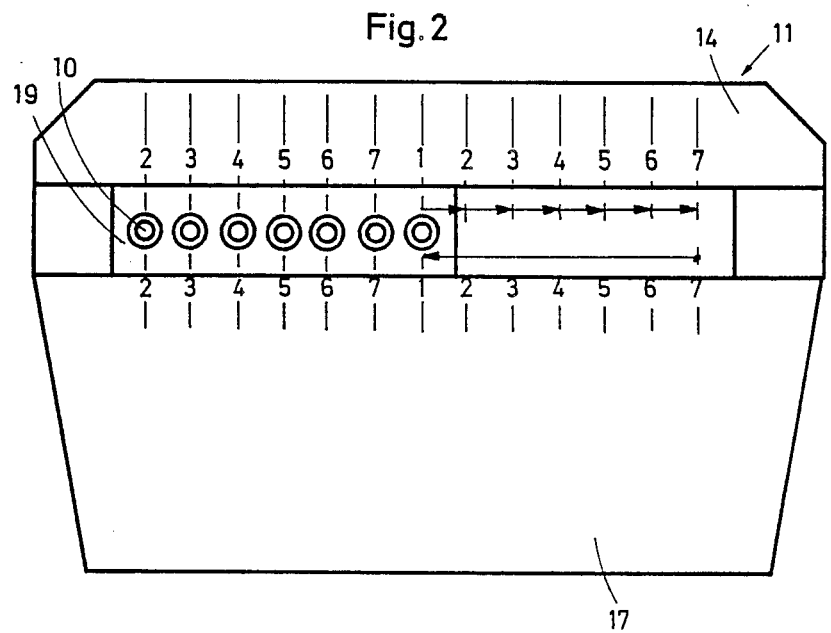

The invention with additional advantages is described hereinbelow with reference to schematic drawings wherein:

FIG. 1 shows the basic principle of the multiple-spindle automatic lathe,

FIG. 2 is a front view of a first embodiment of the automatic lathe with seven spindles, FIG. 3 is a lateral view of the automatic lathe according to FIG. 2, FIG. 4 illustrates the mode of operation of the automatic lathe with seven spindles with the aid of showing cyclic feed and return of the spindle slide in two operating cycles, and FIG. 5 is a front view of a second embodiment of the automatic lathe with an oblique arrangement of five spindles and nine machining stations.

The basic structure of an automatic lathe depicted in FIG. 1, with eight work spindles 10 for the manufacture of workpieces in eight successive machining stations resides in that, in addition to the number of basic tool stations 1 through 8, each basic tool station except for the first is once again provided as additional tool stations 2 through 8, arranged in the same machining sequence upstream of the basic tool stations 1 through 8 so that the total number of machining stations amounts to $N=2n-1$, a loading as well as unloading station being arranged at the tool station 1. Machining of the workpieces in the automatic lathe is performed so that each workpiece, after each machining in a tool station, is shifted cyclically in a linear fashion relatively to the subsequent station, and, after seven conveying steps and a subsequent return stroke, or a return stroke between two conveying steps, enters into its initial machining station.

The automatic lathe 11 according to FIGS. 2 and 3 comprises seven work spindles 10 with workholding fixtures, not shown, as well as seven basic tool stations 1 through 7 with vertically and horizontally arranged tools. Furthermore, the automatic lathe 11 includes, as additional tool stations 2-7, each basic tool station except for the first, these additional tool stations being arranged in the same sequence of machining upstream of the basic tool stations 1-7. The automatic lathe therefore has thirteen machining stations in total.

The vertical tool stations 2-7 and 1-7 with the tools 12 are located on a fixed slide 13 in a joint support 14. The horizontal tool stations 2-7 and 1-7 with the tools 15 are arranged on a fixed slide 16. Vertical and horizontal machining stations 2-7 and 1-7 are housed by a basic frame 17. The work spindles 10 are arranged in a joint headstock 18 on a slide 19 executing, by means of a hydraulic drive mechanism, not shown, a cyclic advance and a continuous return stroke. Each spindle 10 is driven by an electric motor with infinitely variable speed control, this motor not being illustrated.

The loading and unloading device for the workpieces is located at tool station 1.

FIG. 3 illustrates that the vertical tools 12 can be brought into play individually or in paired opposition over the entire peripheral range of a workpiece, and that the front side of a workpiece is covered by the horizontal tools 15.

The mode of operation of the automatic lathe 11 according to FIGS. 2 and 3 can be seen from FIG. 4.

An operating cycle of the automatic lathe 11 encompasses a cyclic advancement of the slide 19 with the seven work spindles 10 over six cycle steps, the slide 19 passing from the starting position 19' into the final position 19'', as well as a continuous return stroke of the slide 19 from the final position 19'' back to the starting position 19'.

For example, when, in the starting position 19' of the slide 19, after previous removal of a finished workpiece in the basic tool station 1 by the unloading device, a new workpiece 1' is introduced into the mounting means, e.g. a chuck, of the first work spindle by the loading device, then this workpiece 1' passes, with six cycle steps of the slide 19 during the operating cycle of the automatic lathe, through all basic tool stations 1-7 into station 7, and from there is transported by the return stroke of the slide 19 from position 19'' to position 19' back into the initial machining station 1 and, in the latter, is removed by means of the unloading device.

The workpiece 4', passing, for example, after the third advancement cycle step of the slide 19 at the tool station 1 into the mounting means of the fourth work spindle, travels during the three remaining cycle steps of the operating cycle through the basic tool stations 2-4, is conveyed by the return of the slide 19 from position 19'' into position 19' into the additional tool station 5, and passes, after three feeding cycle steps of the slide 19, in the subsequent operating cycle of the automatic lathe via stations 6 and 7 into the basic tool station 1 and therein, with the machining step being finished, is again removed by means of the unloading device.

FIG. 4 illustrates an additional advantage of the automatic lathe residing in that the tool stations 2-7 and 1-7, beginning with station 2, are not occupied during an operating cycle, at least over the period of one operating increment and maximally over six operating increments, so that the tools can cool off and thereby show an increased service life.

FIG. 5 shows another embodiment of an automatic lathe 20 with an oblique arrangement of the tool stations 2-5 and 1-5, as well as of the slides 13, 16 carrying the tools 12, 15, and of the slide 19 for the work spindles 10.

Furthermore, a vertical arrangement of the tool stations is likewise possible.

The aforedescribed construction principle opens up the possibility of manufacturing two or more identical or different workpieces simultaneously in a multiple-spindle automatic lathe with a corresponding increase of the number of loading and unloading devices.

Finally, on account of the infinitely variable speed control of each drive motor for the individual work spindles, it is possible to drive, in one group of machining stations, spindles at the same or differing numbers of revolution and simultaneously to shut off spindles in other stations, so that, for example, in one station a cylindrical section is turned at a rotating workpiece and, in the two subsequent stations, the stationary workpiece is provided with a threaded bore. This example clearly shows that the manufacturing possibilities of the automatic lathe are considerably broadened as compared with conventional automatic lathes on account of the infinitely variable speed control of the drive motors for the spindles.

The above-explained basic principle applied to a chuck-type automatic lathe can also be utilized in automatic bar lathes.

We claim:

1. A multiple-spindle automatic lathe for the production of workpieces in successive tool stations with work spindles (10) and tool stations shiftable cyclically with respect to one another, the work spindles and tool stations being disposed in rectilinear arrays parallel to each other, the number of work spindles being neither more nor less than n and the number of tool stations being neither more nor less than $2n-1$, the tool stations being disposed in the sequence 2 to n followed by 1 to n, whereby each workpiece, after each machining operation in a tool station, may be shifted cyclically in a linear fashion relative to a subsequent station and, after $n-1$ conveying steps and a subsequent return stroke, or a return stroke between two conveying steps, may return to an initial machining station, and loading and unloading means for workpieces at at least one tool station.

2. An automatic lathe as claimed in claim 1, in which said loading and unloading means is disposed in tool station 1.

3. An automatic lathe as claimed in claim 1, and separate drive means with infinitely variable speed control for each said spindle.

* * * * *